(12) United States Patent
Kang et al.

(10) Patent No.: US 10,791,187 B2
(45) Date of Patent: Sep. 29, 2020

(54) INFORMATION DISPLAYING METHOD AND APPARATUS, AND STORAGE MEDIUM

(71) Applicant: Beijing Xiaomi Mobile Software Co., Ltd., Haidian District, Beijing (CN)

(72) Inventors: Shangmingxue Kang, Beijing (CN); Peng Zhang, Beijing (CN); Yihong Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 699 days.

(21) Appl. No.: 15/477,979

(22) Filed: Apr. 3, 2017

(65) Prior Publication Data

US 2017/0318109 A1 Nov. 2, 2017

(30) Foreign Application Priority Data

Apr. 29, 2016 (CN) .......................... 2016 1 0282790

(51) Int. Cl.
*G06F 16/25* (2019.01)
*H04L 29/08* (2006.01)
(Continued)

(52) U.S. Cl.
CPC ............ *H04L 67/26* (2013.01); *G06F 9/4843* (2013.01); *G06F 16/252* (2019.01);
(Continued)

(58) Field of Classification Search
CPC ........ G06F 9/48; G06F 9/4806; G06F 9/4843; G06F 16/252
See application file for complete search history.

(56) References Cited

U.S. PATENT DOCUMENTS 9,032,321 B1 5/2015 Cohen et al.
2009/0124241 A1 5/2009 Krishnaswamy et al.
(Continued)

FOREIGN PATENT DOCUMENTS

CN 1707409 A 12/2005
CN 101958968 A 1/2011
(Continued)

OTHER PUBLICATIONS

Extended European search report issued in corresponding European Application No. 17161129.6, dated Aug. 4, 2017, 14 pages.
(Continued)

*Primary Examiner* — Robert W Beausoliel, Jr.
*Assistant Examiner* — Nirav K Khakhar
(74) *Attorney, Agent, or Firm* — Arch & Lake LLP

(57) ABSTRACT

Method, apparatus, and a storage medium are provided for displaying information in the field of computer technology. The method may include: receiving a wakeup operation; acquiring a content in a page displayed by an application which is running in foreground on a terminal; predicting a service to be invoked by a user, based on the content; and displaying information of the service. Instead of performing by a user a series of operations to control a terminal to display information of a service, the disclosed method and apparatus enable prediction of a service to be invoked by the user based on a content currently viewed by the user and active display of information of the service, thereby achieving the effect of accelerating display of the information of the service with less manual operations on the terminal.

17 Claims, 6 Drawing Sheets

(51) Int. Cl.
*G06F 9/48* (2006.01)
*H04M 1/725* (2006.01)
*H04W 52/02* (2009.01)

(52) U.S. Cl.
CPC ..... *H04M 1/72552* (2013.01); *H04W 52/027* (2013.01); *Y02D 70/142* (2018.01); *Y02D 70/144* (2018.01); *Y02D 70/166* (2018.01)

(56) References Cited

U.S. PATENT DOCUMENTS

| | | |
|---|---|---|
| 2009/0125462 A1 | 5/2009 | Krishnaswamy et al. |
| 2009/0125517 A1 | 5/2009 | Krishnaswamy et al. |
| 2009/0125585 A1 | 5/2009 | Krishnaswamy et al. |
| 2009/0216847 A1 | 8/2009 | Krishnaswamy et al. |
| 2015/0100524 A1 | 4/2015 | Pantel et al. |
| 2015/0347204 A1 | 12/2015 | Stanley-Marbell et al. |
| 2015/0350118 A1 | 12/2015 | Yang et al. |
| 2016/0058331 A1 | 3/2016 | Keen et al. |

FOREIGN PATENT DOCUMENTS

| | | |
|---|---|---|
| CN | 102208086 A | 10/2011 |
| CN | 102354194 A | 2/2012 |
| CN | 202475468 U | 10/2012 |
| CN | 103941607 A | 7/2014 |
| CN | 103970103 A | 8/2014 |
| CN | 104007727 A | 8/2014 |
| CN | 104216972 A | 12/2014 |
| CN | 104469981 A | 3/2015 |
| CN | 104836720 A | 8/2015 |
| CN | 104836928 A | 8/2015 |
| CN | 104880957 A | 9/2015 |
| CN | 104885406 A | 9/2015 |
| CN | 104915225 A | 9/2015 |
| CN | 104933107 A | 9/2015 |
| CN | 104969184 A | 10/2015 |
| CN | 105335398 A | 2/2016 |
| EP | 2958020 A1 | 12/2015 |
| WO | 2015183699 A1 | 12/2015 |

OTHER PUBLICATIONS

Second Office Action (including English translation) issued in corresponding Chinese Patent Application No. 201610282790.6 dated Jan. 24, 2018, 12 pages.

First Office Action (including English translation) issued in corresponding Chinese Patent Application No. 201610282790.6, dated Sep. 29, 2017, 12 pages.

US 10,791,187 B2

INFORMATION DISPLAYING METHOD AND APPARATUS, AND STORAGE MEDIUM

CROSS-REFERENCE TO RELATED APPLICATION

This application is based on and claims the priority of the Chinese patent application No. 201610282790.6, filed on Apr. 29, 2016, which is incorporated herein by reference in its entirety.

TECHNICAL FIELD

The present application is related to the field of computer technology, and more particularly to an information displaying method and apparatus, and a storage medium.

BACKGROUND

Terminals tend to become people's personal assistants, which can learn people's lifestyle and preferences so as to provide their users with valuable services at proper times.

Nowadays, a terminal must operate under the control of its user. For example, when a user views an article by using a browser in a terminal and if the user wants to learn more about certain keywords in the article, the user has to quit the currently browsed article and then enter the keywords in the browser to conduct searching and obtain a search result. Thus, there is a need to improve the information displaying on terminals.

SUMMARY

To solve the problem in the related art, the present disclosure provides method, apparatus, and a storage medium for information displaying.

According to a first aspect of the disclosure, there is provided an information displaying method, including: receiving a wakeup operation; acquiring a content in a page displayed by a currently running application in a foreground on a terminal, based on the wakeup operation; predicting a service to be invoked by a user, based on the content; and displaying information of the service.

According to a second aspect of the disclosure, there is provided an information displaying apparatus, including: a processor, and a memory storing instructions executable by the processor. The processor is configured to: receive a wakeup operation; acquire a content in a page displayed by a currently running application in a foreground on a terminal; predict a service to be invoked by a user, based on the content; and display information of the service.

According to a third aspect of the present disclosure, there is provided a non-transitory computer-readable storage medium having stored therein instructions that, when executed by a processor of a mobile terminal, causes the mobile terminal to perform acts including: receiving a wakeup operation; acquiring a content in a page displayed by a currently running application in a foreground on a terminal; predicting a service to be invoked by a user, based on the content; and displaying information of the service.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of example embodiments of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise indicated. The implementations set forth in the following description of embodiments do not represent all implementations consistent with the disclosure. Instead, they are merely examples of apparatuses and methods consistent with aspects related to the disclosure as recited in the appended claims.

Figure 1:
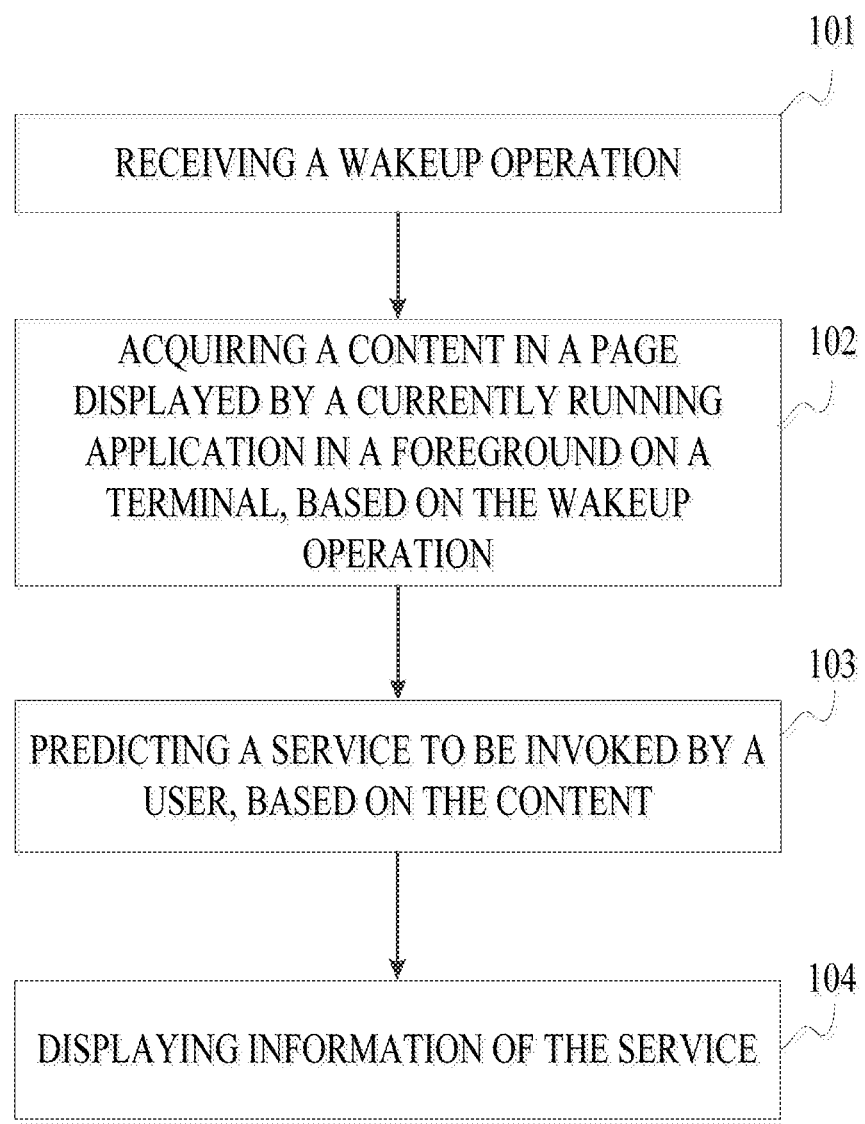
FIG. 1 is a flowchart of an information displaying method according to an exemplary embodiment.

FIG. 1 is a flowchart of an information displaying method according to an exemplary embodiment. The information displaying method may be implemented in a terminal, and the method may include the following steps as shown in FIG. 1.

In step 101, a wakeup operation is received. For example, the terminal may receive the workup operation when a preset button or key is pressed, a voice command is recognized, or any other preset actions is performed on the terminal. The terminal may define different wakeup operations by using different combination of buttons or keys on the terminal. A first wakeup operation may involve a first key and a second wakeup operation may involve the first key and a button. The disclosure does not limit how the wakeup operation is defined as long as the user define or adjust the wakeup operation using a combination of available button or key on the terminal.

In step 102, a content in a page displayed by an application which is running in foreground on a terminal is acquired, based on the wakeup operation. For example, after receiving the wakeup operation, the terminal may acquire the content in the page that is currently displayed at least partially on the display of the terminal. In addition, the terminal may assign different buttons for different types of content. For example, the image content may be acquired when a first wakeup operation is received. The text content may be acquired when a second wakeup operation is received. The highlighted content may be acquired when a third wakeup operation is received.

In step 103, a service to be invoked by a user is predicted, based on the content. The terminal may predict the service to be invoked based solely on the content. Additionally or alternatively, the terminal may predict the service to be invoked based historical actions performed in this application and the current content displayed in the application.

In step 104, information of the service is displayed. For example, the information of the service may include an icon for a corresponding application. The terminal may display the information of the service at a particular area of the display. The particular area of the display may be preset by a user and the particular area may be near an edge of the display. Alternatively or additionally, when the display includes multiple surfaces such as a curved display region, the default area for displaying the information of the service is the curved display region.

In the disclosure, a user does not need to perform a series of operations to control a terminal to display information of a service. The disclosed method enables prediction of a service to be invoked by the user based on a content currently viewed by the user by acquiring a content in a page displayed by an application which is running in foreground on a terminal based on a received wakeup operation. The terminal may predict a service to be invoked by a user based on the content, and display the information of the service. Thus, the problem that, when invoking a service based on a currently viewed content, a user has to manually perform a series of operations to control a terminal to display information of a service is solved, and the effect of accelerating display of the information of the service is achieved.

Figure 2A:
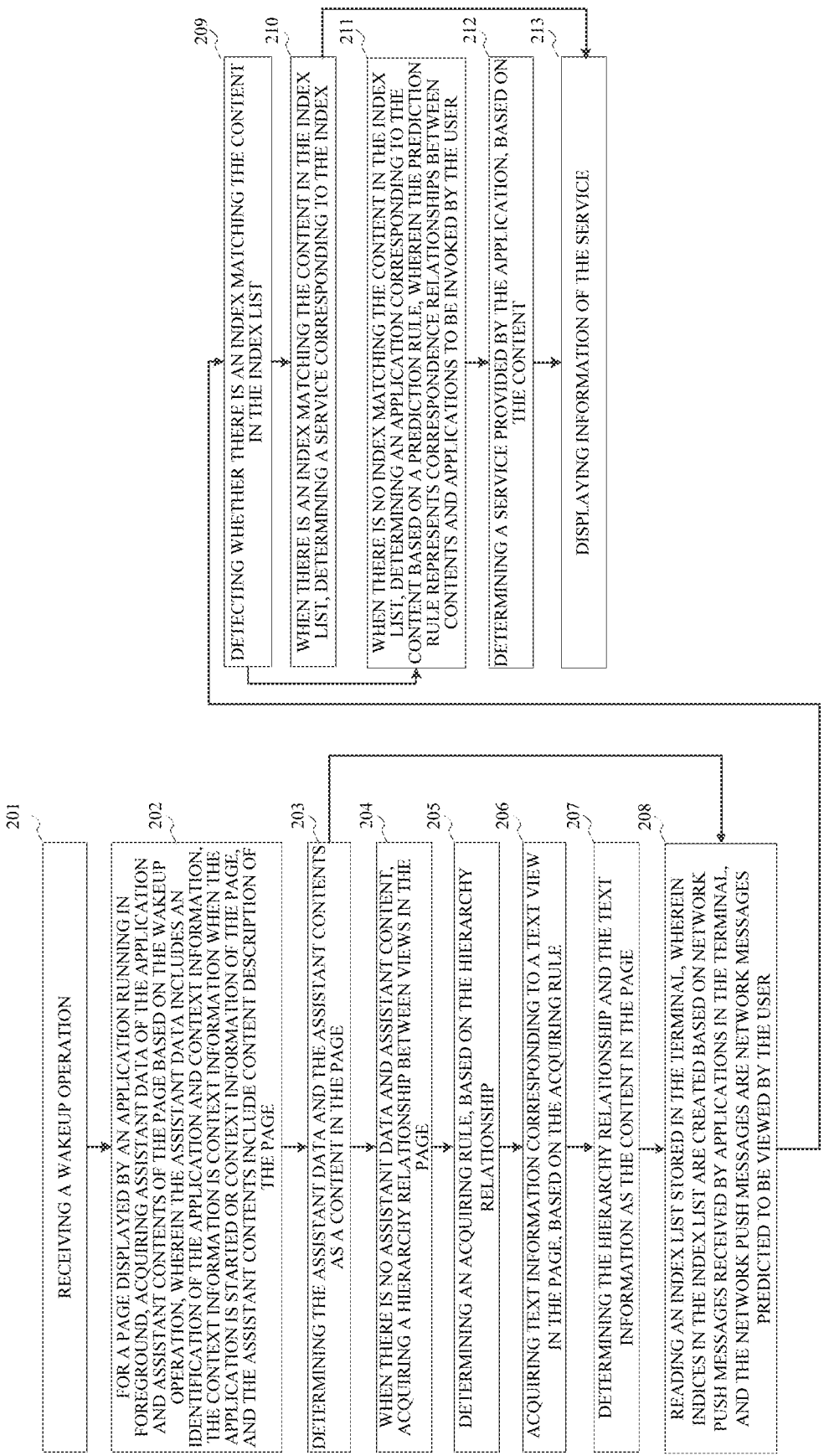
FIG. 2A is a flowchart of an information displaying method according to another exemplary embodiment.

FIG. 2A is a flowchart of an information displaying method according to another exemplary embodiment. As shown in FIG. 2A, the method includes the following steps.

In step 201, a wakeup operation is received. The wakeup operation instructs a terminal to start a smart assistant. The smart assistant is a system-level application which records and learns usage habits of a user, predicts a service to be invoked by the user based on the usage habits of the user, and actively provides the service to the user.

The wakeup operation may be triggered by actuating a physical button of the terminal, by actuating a virtual button of the terminal, by actuating both the physical button and the virtual button, or by performing a predetermined gesture on a display screen or a sensor of the terminal, which is not limited in the disclosure.

In a possible implementation, when a home button is provided on the terminal, the wakeup operation may be obtained by long-pressing the home button.

The terminal may receive the wakeup operation when running any application, and may start the smart assistant according to the wakeup operation so that the smart assistant can be used for any application.

In step 202, for a page displayed by a currently running application in a foreground, assistant data of the application and assistant contents of the page are acquired based on the wakeup operation. The assistant data includes an identification of the application and context information. The context information may indicate context of the currently running application. Alternatively or additionally, the context information may indicate context of the page in the currently running application. For example, the context information may be first context information when the application is started or second context information of the page. The assistant contents include content description of the page.

Here, context information may be provided from the operating system using a class name, which may include the application name or the page name. In other words, the context information hooks the component that has a reference to it to the rest of application environment. The context information may provide global information about an application environment at a specific time point for a specific application. The context information may also represent various environment data that provide access to local files, databases, class loaders associated to the environment, services including system-level services, and more. The context information allows access to application-specific resources and classes, as well as up-calls for application-level operations such as launching activities, broadcasting and receiving intents, etc. For example, the first context information when the application is started may include application names of the most recently running applications, keywords in the most recently running applications. The second context information of the page may include keywords in the page, names of previously opened pages, and other page environment.

In some embodiments, the assistant data and the assistant contents may be all provided by a developer of the application.

The assistant data includes an identification of the application and context information, and the context information includes a class name. If the assistant data is obtained when the application is started, then the context information is context information when the application is started and the class name is a class name of the application. If the assistant data is obtained according to the page displayed by the application after the application is started, then the context information is context information of the page and the class name is a class name of the page. The assistant data may be AssistData, and accordingly the type of the assistant data is Bundle.

The assistant contents include content description of the page. The content description may include a title, a main body and the like, which is not limited in the embodiment. The assistant contents may be AssistContent, and accordingly the data format of the assistant contents follows a standard defined by schema.org.

When a user opens an application, the smart assistant will invoke an onProvideAssistData interface of the application to inform the operating system to read AssistData provided by the application developer. For example, the operating system may be Android. During use of the application, when the user opens each Activity (page) of the application, the smart assistant will invoke the onProvideAssistData interface and an onProvideAssistContent interface. The onProvideAssistData interface is invoked by the smart assistant for informing the Android system to read AssistData provided by the application developer. The onProvideAssistContent interface is invoked by the smart assistant for informing the Android system to read AssistContent provided by the application developer.

In step 203, the assistant data and the assistant contents are determined as a content in the page.

When no assistant data and assistant content is provided by the application developer, the smart assistant may extract the content from the page and steps 204-207 are executed. After the smart assistant has acquired the content, step 208 is executed.

In step 204, when there is no assistant data and assistant content, a hierarchy relationship between views in the page is acquired.

A view may be a View in an Activity, and the hierarchy relationship may be WindowNode.

The hierarchy relationship between views includes a hierarchy relationship shown in the page and a hierarchy relationship not shown in the page. The smart assistant may invoke an onProvideStructure interface to inform the Android system to acquire the hierarchy relationship shown in WindowNode, and invoke an onProvideVirtualStructure interface to inform the Android system to acquire the hierarchy relationship not shown in WindowNode. Main contents of WindowNode are a hierarchy relationship between Views in an Activity.

In step 205, an acquiring rule is acquired based on the hierarchy relationship.

Different hierarchy relationships correspond to different acquiring rules. For example, when the hierarchy relationship is determined as a hierarchy relationship of a social network application according to the hierarchy relationship between views, the acquiring rule may include acquiring one or more latest update in the social network application. When the social network application is a microblog application, the acquiring rule is determined as acquiring several pieces of microblog articles recently published in the page.

In step 206, text information corresponding to a text view in the page is acquired based on the acquiring rule.

The text information may be text information corresponding to TextView in Activity. The smart assistant invokes a createAccessibilityNodeInfo interface to inform the system to acquire ViewNode. Main contents of ViewNode are text information corresponding to TextView in the application.

In step 207, the hierarchy relationship and the text information are determined as the content in the page.

The Android system in return invokes an onHandleAssist interface, and sends the acquired content to the smart assistant. The smart assistant may extract keywords from these data, and then step 208 is executed. Here, the content may be AssistData and AssistContent, or may be ViewNode and WindowNode.

Optionally, as contents in pages displayed by each application in the terminal may reflect the user's habits, the smart assistant may further generate an index from these contents. The smart assistant may generate an index for contents in all pages displayed by an application. At this point, the index at least includes an identification of the application, times when the contents are acquired, titles of the contents, descriptions of the contents, links for opening pages to which the contents belong, a class name, etc.

For example, when the application is a ride hailing application and the user initiates an operation to hail a ride home with the ride hailing application at 9:00 on Monday, contents obtained by the smart assistant include an identification of the ride hailing application, 9:00, hailing a ride home, an origin location, a destination location, an icon of the ride hailing application, a link for opening a "hailing a ride home" page, a class name. When the user initiates an operation to hail a ride home with the ride hailing application at 10:00 on Tuesday, contents obtained by the smart assistant include an identification of the ride hailing application, 10:00, haling a ride home, an origin location, a destination location, an icon of the ride hailing application, a link for opening a "hailing a ride home" page, a class name. Accordingly, the index generated by the smart assistant for the ride hailing application includes the identification of the ride hailing application, (9:00, 10:00), hailing a ride home, the original locations, the destination locations, the icon of the ride haling application, the link for opening the "hailing a ride home" page and the class name.

When generating the index, the smart assistant may preprocess data of each content and perform data-binning according to customized intervals issued by a background server, in order to reduce noise in the data. The preprocessing referred to herein may include eliminating redundant data, unreliable data, etc. The smart assistant may store the preprocessed data in a local database, for example, a SQLite database. When the preprocessed data is stored in the local database, the data in the local SQLite database is processed asynchronously via a Jobscheduler interface provided by the Android system. The processing referred to herein is an IF-THEN classification rule in a data mining method. Finally, a corresponding index is determined, and data is added to the index. The smart assistant presents the resulting index as corresponding recommended contents, according to a configuration issued by the background server. The configuration issued by the background server may be creating a predetermined desktop page, creating tags on the predetermined desktop page and displaying recommended contents on corresponding tags. The predetermined desktop page may also be referred to as "Hiboard."

For example, when courier information is acquired by the smart assistant, the courier information is displayed in a tag corresponding to courier on the predetermined desktop page. When movie information is acquired by the smart assistant, the movie information is displayed in a tag corresponding to movie on the predetermined desktop page.

In one or more embodiments, by modifying the Activity mechanism of the Android system, the onProvideStructure interface, the onProvideVirtualStructure interface and the createAccessibilityNodeInfo interface are invoked during the above-described content acquiring process, instead of being invoked when the home button is long-pressed as in the related art, thereby accomplishing the function of content acquisition without affecting normal operation of the Activity mechanism of the Android system.

In step 208, an index list stored in the terminal is read. Indices in the index list are created based on network push messages received by applications in the terminal, and the network push messages are network messages predicted to be viewed by the user.

Each application may send some network push messages satisfying a predetermined condition to the smart assistant, and the smart assistant generates an index based on all network push messages sent by the application. The predetermined condition may be that the temperature reaches a first threshold, the number of click-throughs reaches a second threshold, etc., which is not limited by the disclosure.

Reference can be made to Step 207 for details of the process for the smart assistant to generate an index based on network push messages, and the process will not be described here redundantly.

In step 209, it is determined whether there is an index matching the content in the index list.

The smart assistant may compare a keyword in the acquired content with text information (such as title and description) in indices. When the text information of one of the indices contains the keyword, the index is determined as matching the content. When there is no index whose text information contains the keyword, it is determined that there is no index matching the content, and step 211 is executed.

For example, when the text information acquired by the smart assistant is "Symbol of Power" and an index corresponding to a network push message sent by "XXyan movie" includes "50% discount on ticket price for Symbol of Power," then the description of the index corresponding to the network push message includes "Symbol of Power" and the index is determined as matching the content.

In step 210, when there is an index matching the content in the index list, a service corresponding to the index is determined.

The smart assistant may acquire information in the index and determine a service corresponding to the index. For example, when a subject in the index that matches the content is a movie, the smart assistant may determine that the service corresponding to the index is buying a ticket for the movie. When a subject in the index that matches the content is a person, the smart assistant may determine that the service corresponding to the index is searching for information of the person. When a subject in the index that matches the content is a mobile phone, the smart assistant may determine that the service corresponding to the index is buying the mobile phone.

In step 211, when there is no index matching the content in the index list, a target application corresponding to the content is determined based on a prediction rule. The prediction rule represents correspondence relationships between contents and applications to be invoked by the user.

When there is no index matching the content in the index list, the smart assistant may search for a service matching the content on the Internet. Before searching, the smart assistant may determine, according to a prediction rule, an application for searching for the content.

The smart assistant may extract from the content several types of keywords and arrange different applications for different types of keywords. The types of keywords include person (celebrity), place, time, commodity, organization (company and organization), event, intellectual product (book, movie, album, TV series).

For example, when the content is related to a person, the corresponding target application may be one of: a search engine, a social network application, or a microblog. When the content is related to a place, the corresponding target application may be a map, a transportation application, a navigation application, etc. When the content relates to an intellectual product, the corresponding application may be a shopping application.

In step 212, a service provided by the application is determined based on the content.

When the application is a search engine, the service is determined as searching for a person in the search engine. When the application is a map, the service is determined as searching for a place in the map. When the application is a shopping application, the service is determined as searching for an intellectual product in the shopping application.

In step 213, information of the service is displayed.

When the service is determined by step 210, the smart assistant determines an application based on an application identification in the index, and displays information of the service in the application. When the service is determined by step 212, the application determined by the smart assistant displays the information of the service.

For example, when the application is a search engine, information on a person is displayed in the search engine. When the application is a map, a place or a navigation path to the place is displayed in the map. When the application is a shopping application, a link, a price, a release time, a photo, etc. of a commodity are displayed in the shopping application.

In a possible implementation scenario, a user reads news about XXphone 5 using a mobile phone, and long-presses the home button to summon a smart assistant. The smart assistant reads contents in the page, and captures a keyword "XXphone 5" in the page. The smart assistant will provide information of XXphone 5, such as a purchasing link, a price and a release time.

Figure 2B:
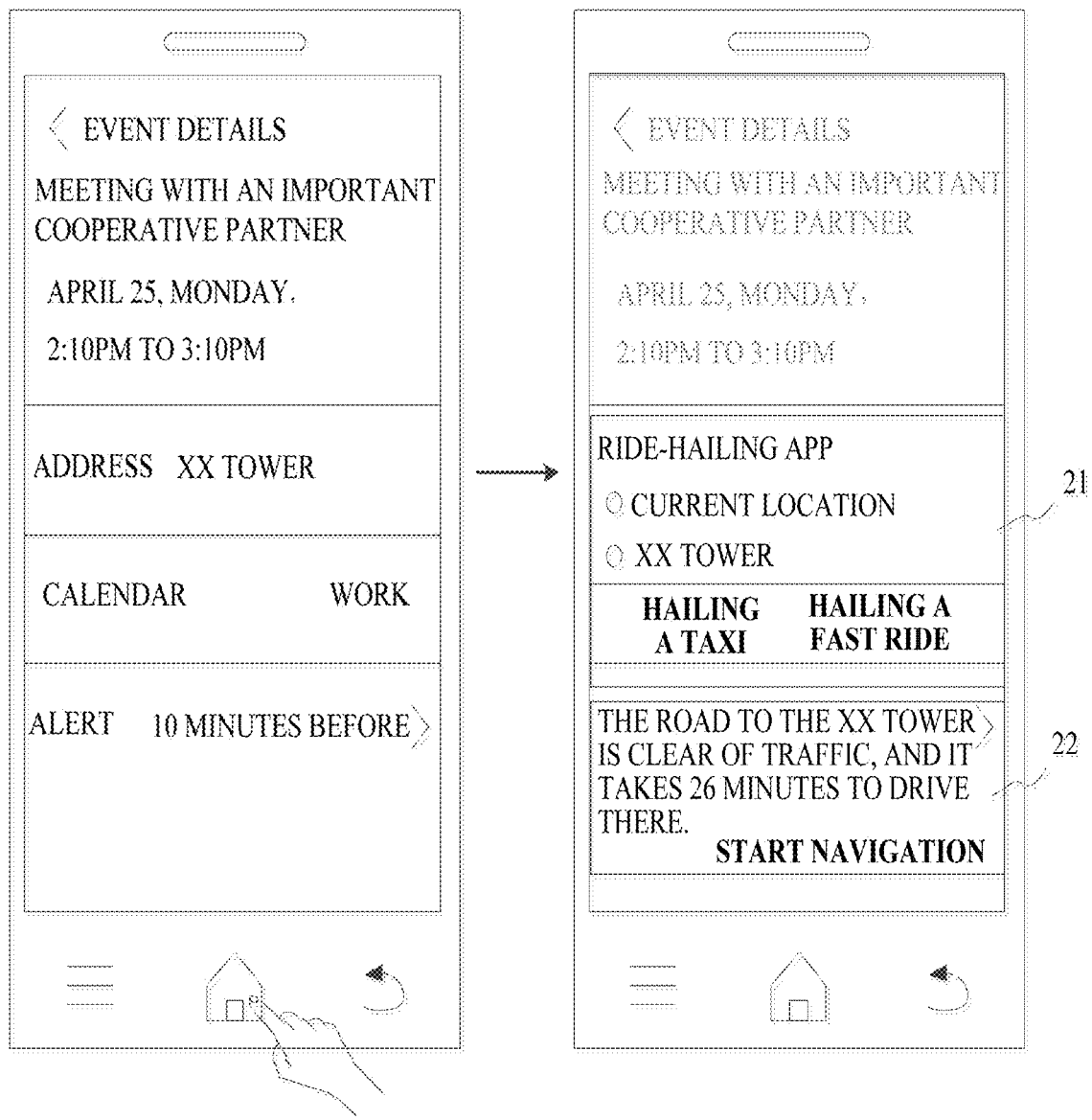
FIG. 2B is a schematic diagram illustrating application of a smart assistant according to an exemplary embodiment.

In another possible implementation scenario, a user views a calendar using a mobile phone. Referring to FIG. 2B, in the left view, contents displayed in the page include a title "meeting with an important cooperative partner," a time "2:10 PM to 3:10 PM, April 25, Monday," an address "XX tower," a type "work," an alert time "10 minutes before." If the content acquired by the smart assistant is "XX tower", then it is determined that the service is hailing a ride from the current location to XX tower or the service is navigation from the current location to XX tower. In the right view, ride hailing service information 21 and navigation path information 22 are displayed.

In another example, when there are multiple contents displayed in a page, the user may highlight one of the content of interest and then summon the smart assistant so that the smart assistant picks the target application based on the highlighted content.

In the disclosed methods and devices, a user does not need to perform a series of operations to control a terminal to display information of a service. The method according to the disclosure enables prediction of a service to be invoked by the user based on a content currently viewed by the user by acquiring a content in a page displayed by an application that is running in a foreground on the terminal. The smart assistant predicts a service to be invoked by a user based on the content and instructs the terminal to display information of the service. Thus, a user does not need to manually perform a series of operations to open a second application and then copy and paste the information from one application to the other application.

In addition, the terminal may work based on local data by reading an index list stored in the terminal. Here, the indices in the index list may be created based on network push messages received by the terminal and the network push messages are network messages predicted to be viewed by the user. The terminal may determine whether there is an index matching the content in the index list. When there is an index matching the content in the index list, the terminal determines a service corresponding to the index. Thus, the terminal may determine, upon receiving a content, a service by finding an index in the index list that matches the content without interacting with a server to determine the service, thereby accelerating acquisition of the service.

Figure 3:
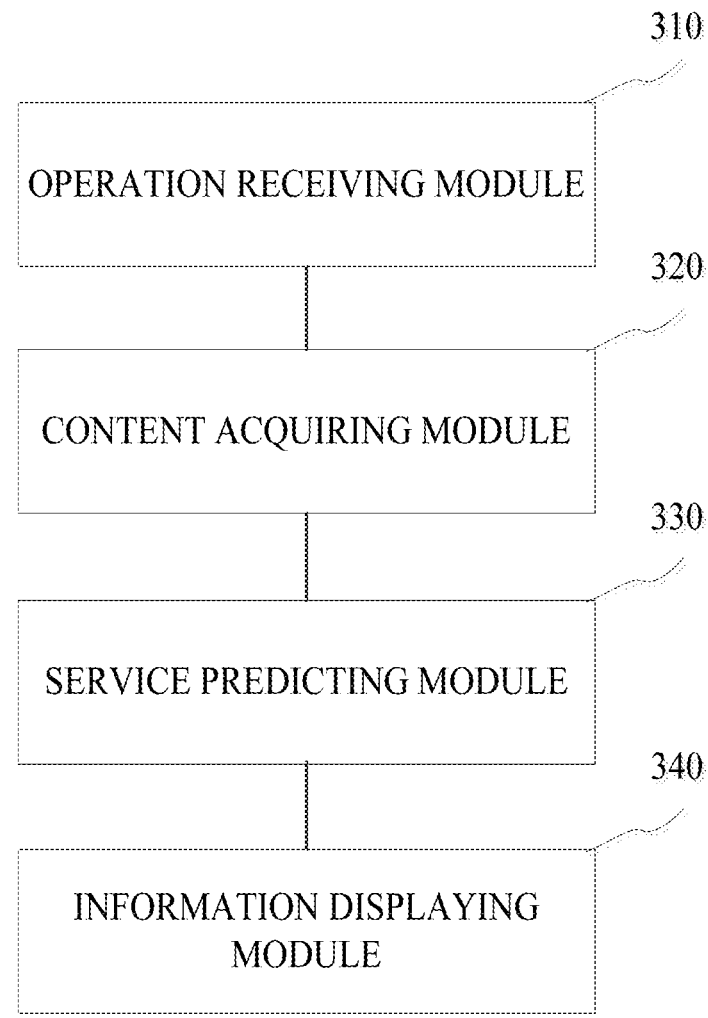
FIG. 3 is a block diagram of an information displaying apparatus according to an exemplary embodiment.

FIG. 3 is a block diagram of an information displaying apparatus according to an exemplary embodiment. The information displaying apparatus may be used in a terminal, and includes an operation receiving module 310, a content acquiring module 320, a service predicting module 330 and an information displaying module 340 as shown in FIG. 3.

The operation receiving module 310 is configured to receive a wakeup operation.

The content acquiring module 320 is configured to acquire a content in a page displayed by a currently running application, based on the wakeup operation received by the operation receiving module 310. The currently running application may be an application which is running in the foreground on a terminal.

The service predicting module 330 is configured to predict a service to be invoked by a user, based on the content acquired by the content acquiring module 320.

The information displaying module 340 configured to display information of the service predicted by the service predicting module 330.

Figure 4:
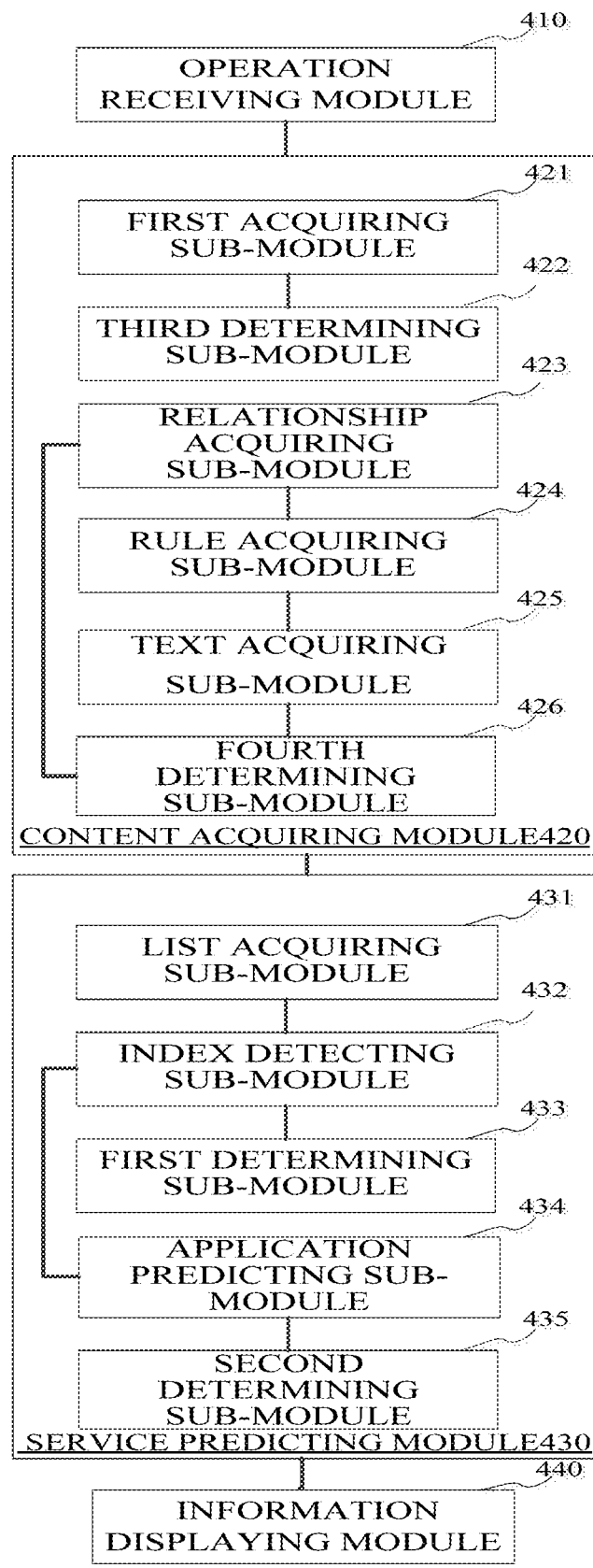
FIG. 4 is a block diagram of an information displaying apparatus according to an exemplary embodiment.

FIG. 4 is a block diagram of an information displaying apparatus according to an exemplary embodiment. The information displaying apparatus is used in a terminal, and includes an operation receiving module 410, a content acquiring module 420, a service predicting module 430 and an information displaying module 440 as shown in FIG. 4.

The operation receiving module 410 is configured to receive a wakeup operation.

The content acquiring module 420 is configured to acquire a content in a page displayed by an application which is running in foreground on a terminal, based on the wakeup operation received by the operation receiving module 410.

The service predicting module 430 is configured to predict a service to be invoked by a user, based on the content acquired by the content acquiring module 420.

The information displaying module 440 is configured to display information of the service predicted by the service predicting module 430.

Alternatively or additionally, the service predicting module 430 includes: a list reading sub-module 431, an index detecting sub-module 432 and a first determining sub-module 433.

The list reading sub-module 431 is configured to read an index list stored in the terminal, wherein indices in the index list are created based on network push messages received by applications in the terminal, and the network push messages are network messages predicted to be viewed by the user.

The index detecting sub-module 432 is configured to detect whether there is an index matching the content in the index list read by the list reading sub-module 431.

The first determining sub-module 433 is configured to, when the index detecting sub-module 432 detects that there is an index matching the content in the index list, determine a service corresponding to the index.

Alternatively or additionally, the service predicting module 430 includes: an application predicting sub-module 434 and a second determining sub-module 435.

The application predicting sub-module 434 is configured to, when the index detecting sub-module 432 detects that there is no index matching the content in the index list, determine a target application corresponding to the content based on a prediction rule, wherein the prediction rule represents correspondence relationships between contents and applications to be invoked by the user.

The second determining sub-module 435 is configured to determine a service provided by the application, based on the content.

Alternatively or additionally, the content acquiring module 420 includes: a first acquiring sub-module 421 and a third determining sub-module 422.

The first acquiring sub-module 421 is configured to, for the page displayed by the application running in foreground, acquire assistant data of the application and assistant contents of the page based on the wakeup operation, wherein the assistant data includes an identification of the application and context information, the context information is context information when the application is started or context information of the page, and the assistant contents include content description of the page.

The third determining sub-module 422 is configured to determine the assistant data and the assistant contents acquired by the first acquiring sub-module as the content in the page.

Alternatively or additionally, the content acquiring module 420 includes: a relationship acquiring sub-module 423, a rule acquiring sub-module 424, a text acquiring sub-module 425 and a fourth determining sub-module 426.

The relationship acquiring sub-module 423 is configured to, when there is no assistant data and assistant content, acquire a hierarchy relationship between views in the page.

The rule acquiring sub-module 424 is configured to determine an acquiring rule, based on the hierarchy relationship acquired by the relationship acquiring sub-module.

The text acquiring sub-module 425 is configured to acquire text information corresponding to a text view in the page, based on the acquiring rule acquired by the rule acquiring sub-module 424.

The fourth determining sub-module 426 is configured to determine the hierarchy relationship acquired by the relationship acquiring sub-module 423 and the text information acquired by the text acquiring sub-module 425 as the content in the page.

In conclusion, instead of performing by a user a series of operations to control a terminal to display information of a service, the information displaying apparatus provided by the disclosure enables prediction of a service to be invoked by the user based on a content currently viewed by the user and active display of information of the service, by acquiring a content in a page displayed by an application which is running in foreground on a terminal based on a received wakeup operation, predicting a service to be invoked by a user based on the content, and displaying information of the service. Thus, the problem that, when invoking a service based on a currently viewed content, a user has to manually perform a series of operations to control a terminal to display information of a service is solved, and the effect of accelerating display of the information of the service is achieved.

By reading an index list stored in the terminal wherein indices in the index list are created based on network push messages received by the terminal and the network push messages are network messages predicted to be viewed by the user, detecting whether there is an index matching the content in the index list, and when there is an index matching the content in the index list determining a service corresponding to the index, indices may be created in advance based on the network push messages, so that the terminal can determine, upon receiving a content, a service by finding an index in the index list that matches the content without interacting with a server to determine the service, thereby accelerating acquisition of the service.

Regarding the apparatus in the above embodiments, the specific manners for the individual modules to perform operations have been described in detail in the embodiments of the related methods and will not be elaborated herein.

An exemplary embodiment of the disclosure provides an information displaying apparatus, which can implement the information displaying method according to the disclosure. The information displaying apparatus includes a processor and a memory storing instructions executable by the processor.

The processor is configured to receive a wakeup operation; acquire a content in a page displayed by an application which is running in foreground on a terminal, based on the wakeup operation; predict a service to be invoked by a user, based on the content; and display information of the service.

Figure 5:
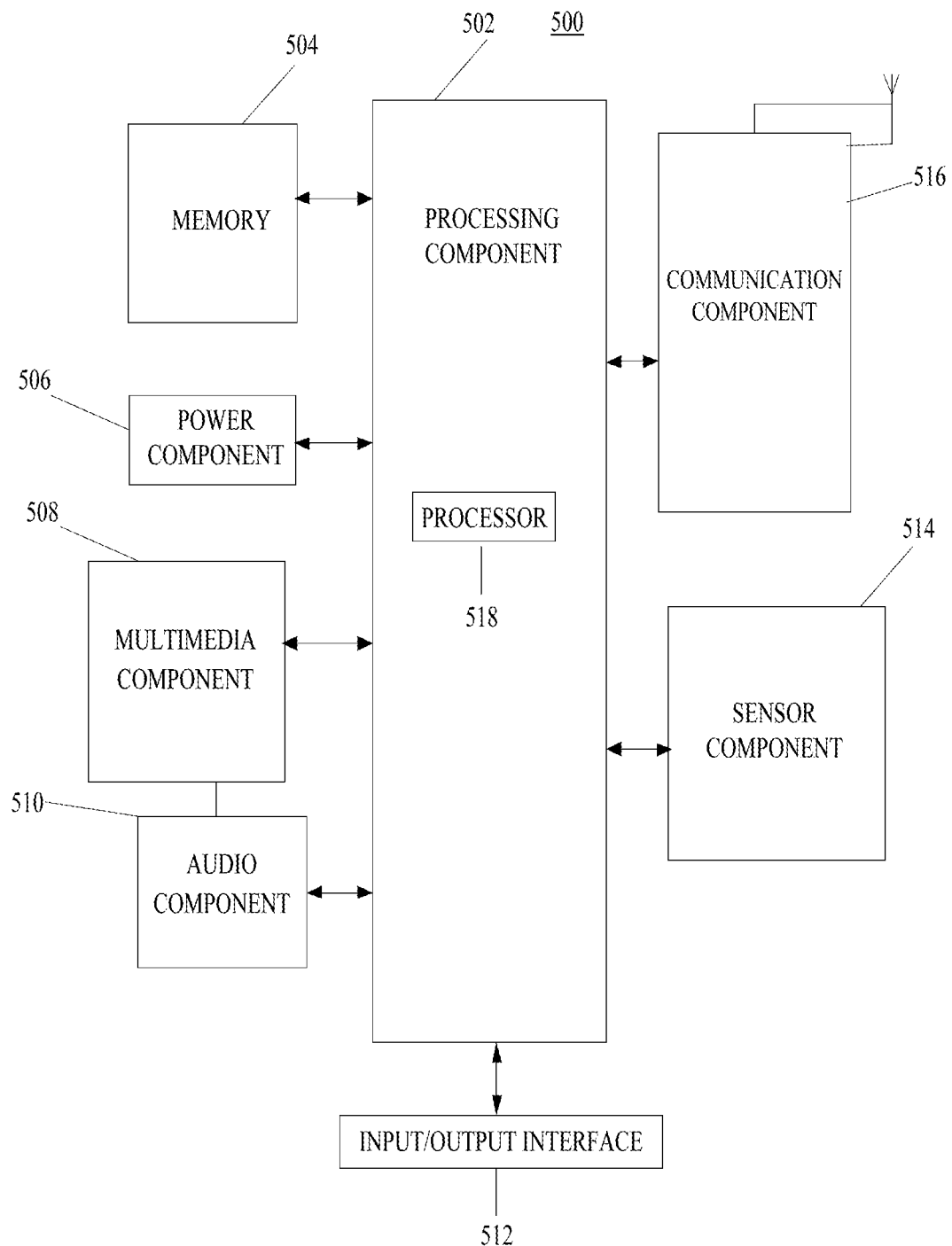
FIG. 5 is a block diagram illustrating an information displaying apparatus according to an exemplary embodiment.

FIG. 5 is a block diagram of an information displaying apparatus 500 according to an exemplary embodiment. For example, the apparatus 500 may be a mobile phone, a computer, a digital broadcast terminal, a messaging device, a gaming console, a tablet device, a medical device, exercise equipment, a personal digital assistant or the like.

Referring to FIG. 5, the apparatus 500 may include one or more of the following components: a processing component 502, a memory 504, a power component 506, a multimedia component 508, an audio component 510, an input/output (I/O) interface 512, a sensor component 514 and a communication component 516.

The processing component 502 typically controls overall operations of the apparatus 500, such as the operations associated with display, telephone calls, data communications, camera operations and recording operations. The processing component 502 may include one or more processors 520 to execute instructions to perform all or some of the steps in the above described methods. Moreover, the processing component 502 may include one or more modules which facilitate the interaction between the processing component 502 and other components. For example, the processing component 502 may include a multimedia module to facilitate the interaction between the multimedia component 508 and the processing component 502.

The memory 504 is configured to store various types of data to support the operation of the apparatus 500. Examples of such data include instructions for any applications or methods operated on the apparatus 500, various kinds of data, messages, pictures, video, etc. The memory 504 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 may include a power management system, one or more power sources, and any other components associated with the generation, management, and distribution of power in the apparatus 500.

The multimedia component 508 includes a screen providing an output interface between the apparatus 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the apparatus 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the apparatus 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500, relative positioning of components, e.g., the display and the keypad, of the apparatus 500, a change in position of the apparatus 500 or a component of the apparatus 500, presence or absence of user's contact with the apparatus 500, an orientation or an acceleration/deceleration of the apparatus 500, and a change in temperature of the apparatus 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor or a temperature sensor.

The communication component 516 is configured to facilitate communication, wired or wirelessly, between the apparatus 500 and other devices. The apparatus 500 can access a wireless network based on a communication standard, such as WiFi, 2G, or 3G, or a combination thereof. In one embodiment, the communication component 516 receives a broadcast signal or broadcast associated information from an external broadcast management system via a broadcast channel. In one embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more embodiments, the apparatus 500 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus 500 may use the circuitries in combination with the other hardware or software components for performing the above described methods. Each module, sub-module, unit, or sub-unit in the disclosure may be implemented at least partially using the one or more circuitries.

In an embodiment, there is also provided a non-transitory computer-readable storage medium including instructions, such as included in the memory 504, executable by the processor 520 in the apparatus 500, for performing the above-described methods. For example, the non-transitory computer-readable storage medium may be a ROM, a RAM, a CD-ROM, a magnetic tape, a floppy disc, an optical data storage device or the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information displaying method, comprising:
   receiving, by a terminal comprising a display and a processor controlling the display, a wakeup operation;
   acquiring, by the terminal, a content in a page displayed by a currently running application in a foreground on the terminal, based on the wakeup operation;
   predicting, by the terminal, a service to be invoked by a user, based at least partially on the content; and
   displaying, by the terminal, information of the service at least partially on the display, wherein predicting the service to be invoked by the user, based on the content, comprises:
   reading, by the terminal, an index list stored in the terminal, wherein the index list comprises indices created based on network push messages received by one or more applications in the terminal, and the network push messages are network messages predicted to be viewed by the user;
   detecting, by the terminal, whether there is an index matching the content in the index list; and
   when there is an index matching the content in the index list, determining, by the terminal, the service corresponding to the index.

2. The method of claim 1, further comprising:
   when there is no index matching the content in the index list, determining a target application corresponding to the content based on a prediction rule, wherein the prediction rule represents correspondence relationships between contents and applications to be invoked by the user; and
   determining a service provided by the target application, based on the content.

3. The method of claim 1, wherein acquiring the content in the page displayed by the currently running application in the foreground on the terminal comprises:
   for the page displayed by the currently running application in the foreground, acquiring assistant data of the application and assistant contents of the page based on the wakeup operation, wherein the assistant data includes an identification of the application and context information, and the assistant contents include content description of the page; and
   determining the assistant data and the assistant contents as the content in the page.

4. The method of claim 3, wherein the context information indicates at least one of:
   application context information when the currently running application is started; and
   page context information of the page displayed by the currently running application.

5. The method of claim 3, further comprising:
   when there is no assistant data and assistant content, acquiring a hierarchy relationship between views in the page; and
   determining an acquiring rule, based on the hierarchy relationship.

6. The method of claim 5, further comprising:
   acquiring text information corresponding to a text view in the page, based on the acquiring rule; and
   determining the hierarchy relationship and the text information as the content in the page.

7. An apparatus for displaying information, comprising:
   a display;
   a processor controlling the display, and
   a memory storing instructions executable by the processor,
   wherein the processor is configured to:
      receive a wakeup operation;
      acquire a content in a page displayed by a currently running application in a foreground on the apparatus;
      predict a service to be invoked by a user, based on the content; and
      instruct the display to display information of the service at least partially on the display, wherein predicting the service to be invoked by the user, based on the content, comprises:
      reading, by the terminal, an index list stored in the terminal, wherein the index list comprises indices created based on network push messages received by one or more applications in the terminal, and the network push messages are network messages predicted to be viewed by the user;
      detecting, by the terminal, whether there is an index matching the content in the index list; and
      when there is an index matching the content in the index list, determining, by the terminal, the service corresponding to the index.

8. The apparatus of claim 7, wherein the processor is further configured to:
   when there is no index matching the content in the index list, determine a target application corresponding to the content based on a prediction rule, wherein the prediction rule represents correspondence relationships between contents and applications to be invoked by the user; and
   determine a service provided by the target application, based on the content.

9. The apparatus of claim 7, wherein acquiring the content in the page displayed by the currently running application in the foreground on the apparatus, based on the wakeup operation, comprises:
- for the page displayed by the currently running application in the foreground, acquiring assistant data of the application and assistant contents of the page based on the wakeup operation, wherein the assistant data includes an identification of the application and context information, and the assistant contents include content description of the page; and
- determining the assistant data and the assistant contents as the content in the page.

10. The apparatus of claim 9, wherein the context information indicates at least one of:
- application context information when the currently running application is started; and
- page context information of the page displayed by the currently running application.

11. The apparatus of claim 8, wherein the processor is further configured to:
- when there is no assistant data and assistant content, acquire a hierarchy relationship between views in the page; and
- determine an acquiring rule, based on the hierarchy relationship.

12. The apparatus of claim 11, wherein the processor is further configured to:
- acquire text information corresponding to a text view in the page, based on the acquiring rule; and
- determine the hierarchy relationship and the text information as the content in the page.

13. A non-transitory computer-readable storage medium having stored therein instructions that, when executed by a processor of a mobile terminal, causes the mobile terminal to perform acts comprising:
- receiving a wakeup operation;
- acquiring a content in a page displayed by a currently running application in a foreground on the mobile terminal;
- predicting a service to be invoked by a user, based on the content; and
- displaying information of the service, wherein predicting the service to be invoked by the user, based on the content, comprises:
  - reading, by the terminal, an index list stored in the terminal, wherein the index list comprises indices created based on network push messages received by one or more applications in the terminal, and the network push messages are network messages predicted to be viewed by the user;
  - detecting, by the terminal, whether there is an index matching the content in the index list; and
  - when there is an index matching the content in the index list, determining, by the terminal, the service corresponding to the index.

14. The non-transitory computer-readable storage medium of claim 13, wherein the acts further comprise:
- when there is no index matching the content in the index list, determining a target application corresponding to the content based on a prediction rule, wherein the prediction rule represents correspondence relationships between contents and applications to be invoked by the user; and
- determining a service provided by the target application, based on the content.

15. The non-transitory computer-readable storage medium of claim 13, wherein acquiring the content in the page displayed by the currently running application in the foreground on the terminal comprises:
- for the page displayed by the currently running application in the foreground, acquiring assistant data of the application and assistant contents of the page based on the wakeup operation, wherein the assistant data includes an identification of the application and context information, and the assistant contents include content description of the page; and
- determining the assistant data and the assistant contents as the content in the page.

16. The non-transitory computer-readable storage medium of claim 15, wherein the context information indicates at least one of:
application context information when the currently running application is started; and
- page context information of the page displayed by the currently running application.

17. The non-transitory computer-readable storage medium of claim 15, further comprising:
- when there is no assistant data and assistant content, acquiring a hierarchy relationship between views in the page;
- determining an acquiring rule, based on the hierarchy relationship;
- acquiring text information corresponding to a text view in the page, based on the acquiring rule; and
- determining the hierarchy relationship and the text information as the content in the page.

* * * * *